March 6, 1962     E. M. TRAVIS     3,023,646
CHAIN SAW SHARPENER
Filed Sept. 19, 1958     2 Sheets-Sheet 1
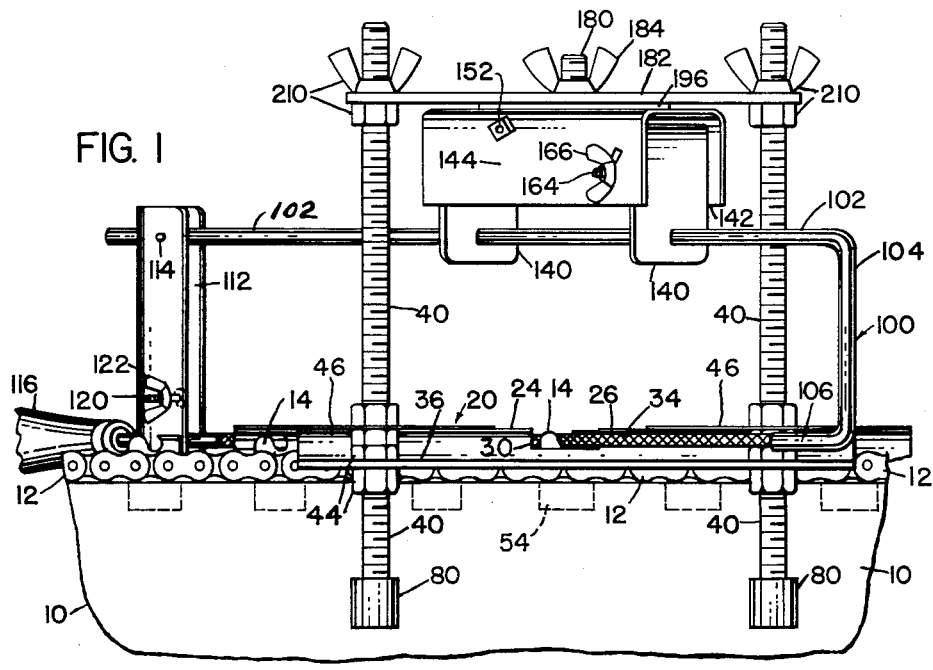
FIG. 1
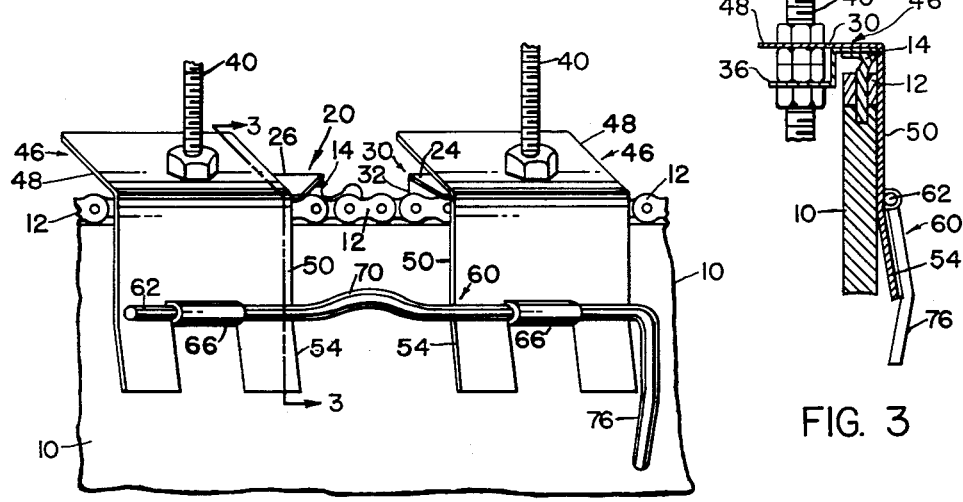
FIG. 2
FIG. 3
*INVENTOR.*
ERNEST M. TRAVIS
BY March 6, 1962  E. M. TRAVIS  3,023,646
CHAIN SAW SHARPENER Filed Sept. 19, 1958  2 Sheets-Sheet 2

INVENTOR.
ERNEST M. TRAVIS

United States Patent Office 3,023,646
Patented Mar. 6, 1962

3,023,646
CHAIN SAW SHARPENER
Ernest M. Travis, Sidney, Iowa, assignor to
John W. Orton, Sidney, Iowa
Filed Sept. 19, 1958, Ser. No. 762,184
5 Claims. (Cl. 76—31)

This invention relates to saw chain sharpeners and more particularly it is an object of this invention to provide a sharpener which will sharpen a saw more efficiently, quickly and precisely than heretofore.

A particular object of the invention is to provide a chain saw sharpener having a back stop adapted to closely fit against the back side of the chain at a tooth being sharpened so that the force of the filing is absorbed without vibration of the tooth, for more rapid and accurate filing.

A further object of the invention is to provide gauge means which engages the top of the tooth being filed, holding the entire sharpener mechanism in a position with respect to the top of the tooth being filed so that the maximum depth of cutting of the file itself is accurately fixed. Heretofore gauge members of the sharpener engaged the upper surfaces of other teeth widely spaced from the tooth being actually sharpened and I have found that the positioning is much more accurate when the very tooth that is being sharpened is used to receive the gauge members thereagainst, because of the variation in height of different teeth.

Another object of the invention is to provide a more proper positioning of a plate for indicating the angle and degrees at which the file is positioned with respect to the saw, and particularly in the placing of this degree plate on the top of the sharpener where it can be readily seen.

Yet a further object is to provide interlocking means in the degree plate and in the attached saw carrying frame member for making it possible to rigidly lock and easily unlock the frame member from different degree positions on the gauge plate.

A further object of the invention is to provide means for carrying a file which in effect provides an extension on the outer end of the file whereby a much greater portion of the length of the file can be used for actual filing than heretofore. For example, in the patent to Nielson, No. 2,762,241, issued Sept. 11, 1956, entitled Portable Chain Saw Filing Engaging Device, a guide rod is bent downwardly toward the file at its outer end and this bent portion cannot slide through the opening in the guide rod carrier.

Heretofore the back end of the file has been held by an attachment of set screws through an aperture in a member attaching the file to a guide rod and I have found that the use of the set screw tends to cause a curve in the file when it is tightened too tight. It is therefore an object of my invention to provide means for engaging the file at this point along wide surfaces on each side thereof.

A further object of the invention is to provide more simple and quickly applicable means for adjusting the height of the file, whereby fewer parts are necessary.

A particular object is to provide means for clamping the sharpener on the saw providing an elongated clamping member having a lever at one end for ease of clamping and an offset portion at the center functioning as a cam and pressing against the saw bar precisely at the position of the exact tooth being sharpened for providing rigidity, this clamping device providing for rapid removal of the sharpener for shifting it from tooth to tooth as sharpening proceeds.

Yet another object of the invention is to provide means in cooperation with the clamp above mentioned for engaging the back side of the saw bar and provided with resilient engaging portions of rubber-like material for gripping against the saw bar to prevent shifting of the sharpener lengthwise on the saw bar.

A further object is to provide an adjustable engagement between the saw bar and back side engaging members, and members to which the latter are attached so that the engaging members can be positioned to engage parts of the saw bar which are to the sides of any openings which are above any openings which might be in the center of the saw bar.

A further object of the invention is to provide a special clamp portion for a saw sharpener which is adapted to be gripped in a vise on the work bench and which is provided with means for receiving the saw chain and for quickly clamping and releasing the saw chain for rapid shifting of the saw chain from a position for sharpening one tooth to a position for sharpening the next, and so forth.

A particular object is to provide a slidable and adjustable engagement between those parts of the sharpener which support the file and that part of the sharpener which is held by the vise with quickly releasable clamp means for clamping the two in a desired position for regulating the filing.

A further object is to provide resilient means for urging the file supporting portions of the sharpener upwardly with respect to the portion that is received in the vise whereby whenever the clamp is released the file and associated parts automatically move upwardly so that this chain can be shifted laterally with one hand and without the need for using a hand to hold the file upwardly as the chain is moved laterally.

A further object is to provide quickly releasable cam action chain clamping.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same ore equivalent principles may be used and structural changes may be made as desired by those skilled in the art without departing from the present invention and the purview of the appended claims.

In the drawings:

FIG. 1 is a view showing the rearward side of a portion of a saw bar with the device of this invention disposed in position thereon;

FIG. 2 is a view showing the forward side of the bar and the lower portion of the sharpener;

FIG. 3 is a view-in-section showing a cross section taken along the lines 3—3 of FIG. 2;

Figures 4, 5:
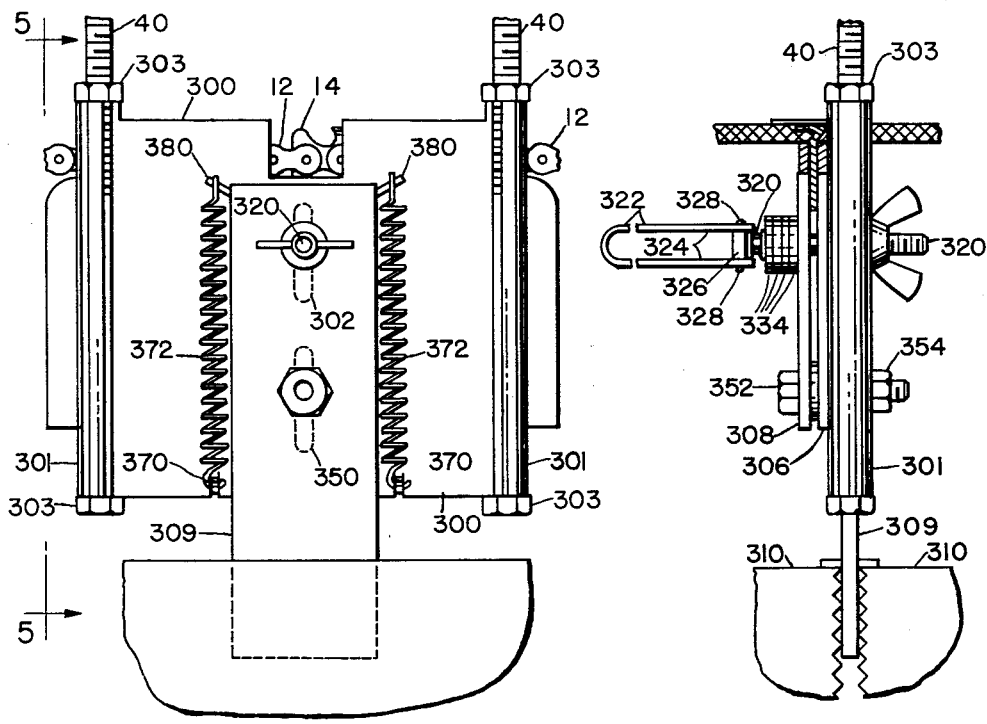
FIG. 4 is a modification of the lower portion of the saw sharpener differing from the lower portion shown in FIG. 2.
FIG. 5 is a view-in-section taken along the line 5—5 of FIG. 4.

The chain saw sharpener of this invention as seen in FIG. 1 is for attachment to the vertical saw bar 10 of a chain saw having a saw chain 12 carrying saw teeth 14.

The sharpener including a lower L-shaped frame having a horizontal saw tooth top-engaging portion generally indicated at 20 and having two horizontally spaced apart sections 24 and 26 each having an under surface disposed horizontally for engaging the upper sides of a plurality of teeth of a horizontally extending row of the teeth 14. In this way the tooth top engaging portion sections 24 and 26 have the effect of positioning the entire sharpener assembly accurately with respect to the teeth and in operation one of the teeth engaged by the tooth top engaging portion 20 is the tooth actually being filed.

The invention also comprises an upper L-shaped frame mounted on and extending below the tooth top engaging portion 20 and having many parts. Forming in one sense a part of the frame is a chain side engaging portion 30, but only in the sense that it supports the tooth top engaging portion 20. The chain side engaging portion 30 has a flat vertical surface on its forward side for receiving the rearward side of the chain 12 to absorb the force of filing and to steady the tooth being filed for more rapid and accurate filing with lesser vibration. The chain side engaging portion 30 is disposed beneath and attached to the rearward side of the top engaging portion 20 and the chain side engaging portion has a notch 32 therein through which an elongated file 34 is approximately horizontally received. The notch 32 can be formed in the manner shown in FIG. 2, in which the chain side engaging portion actually has two spaced apart sections with the space between forming the notch.

A horizontally extending member 36 is attached to the lower edge of the chain side engaging portion 30 and is provided with vertical apertures therethrough spaced apart on opposite sides of the notch 32 whereby vertically extending threaded posts 40 are received therethrough and form a part of the frame, the nuts 44 disposed above and below the portion 36 securing the latter to the posts 40.

It will be seen that the tooth top engaging portions are arranged with those edges which are adjacent each other inclinedly disposed from closer rearward sides to more widely spaced forward sides to give a maximum of clearance for the file and also a maximum of support.

Clamping means is attached to the lower end of the frame for clamping against each side of the saw bar and such clamping means can be of two different types one of which will be described at this time, being shown in FIG. 2, in which upper L-shaped members 46 having horizontal portions 48 are disposed above and engaging said tooth top engaging sections, the members 46 being spaced apart and on each side of the notch 32.

The clamping means of FIG. 2 has vertical portions 50 of its members 46 which extend downwardly alongside the forward side of the saw bar 10, the lower ends of the portions 50 being outturned as seen at 54.

A cam action lever 60 is provided having what can be called a shaft portion 62 extending generally horizontally and rotatably mounted in upwardly curled struck-out portions 66 of the members 50, the shaft portion 62 having an offset clamping portion 70 at its center and disposed between the portions 50, and the clamping portion 70 is adapted to engage against and clamp against the forward side of the saw bar 10 when a handle portion 76 of the cam lever member 60 is swung downwardly from a horizontal release position.

The frame posts 40 extend downwardly alongside the rearward side of the saw bar 10 opposite the portions 50 and have resilient bumpers 80 thereon at their lower ends for firmly engaging the back side of the saw bar 10.

The elongated file 34 is carried by a file carrier generally indicated at 100 and which has an upper horizontally extending elongated portion 102 disposed above and parallel with the file 34.

The file carrier 102 has a downwardly extending rearward portion 104 attached to the rearward end of its upper portion 102 and extends downwardly to a lower horizontal portion 106 attached to the portion 104 and disposed on a level with the file 34 and extending forwardly a substantial distance. The forwardly extending portion 106 is hollow and receives the rearward end of the round file 34 and the elongation of the portion 106 tends to have the effect of extending the length of the file as is of advantage for a longer stroke with a file of a given size.

The forward end of the upper elongated portion 102 of the file carrier is received through a forward vertical support 112 and pinned thereto as at 114, the support 112 extending downwardly and receiving therethrough the forward end of the file 34, a handle 116 of the file 34 being disposed on its outer forward end.

The support 112 is preferably of a U-shape as seen in top plan view whereby the sides of the support 112 are disposed against opposite sides of the file and a bolt 120 is horizontally disposed through the sides of the support 112 and receives a wing nut 122 thereon which when tightened presses against the sides of the file providing a firm support.

The elongated portion 102 of the file carrier is disposed through a first part 140 of a file carrier mounting generally indicated at 142 and which has two parts, the other part including an inverted housing the lower side of which is open, and being called the second or upper part 144. Suitable means, best seen in FIG. 8 and comprising a member 150 having a bolt 152 disposed horizontally therethrough are provided, the member 150 being suitably attached to the first or lower part 140 of the file carrier mounting.

Figures 6, 7, 8:
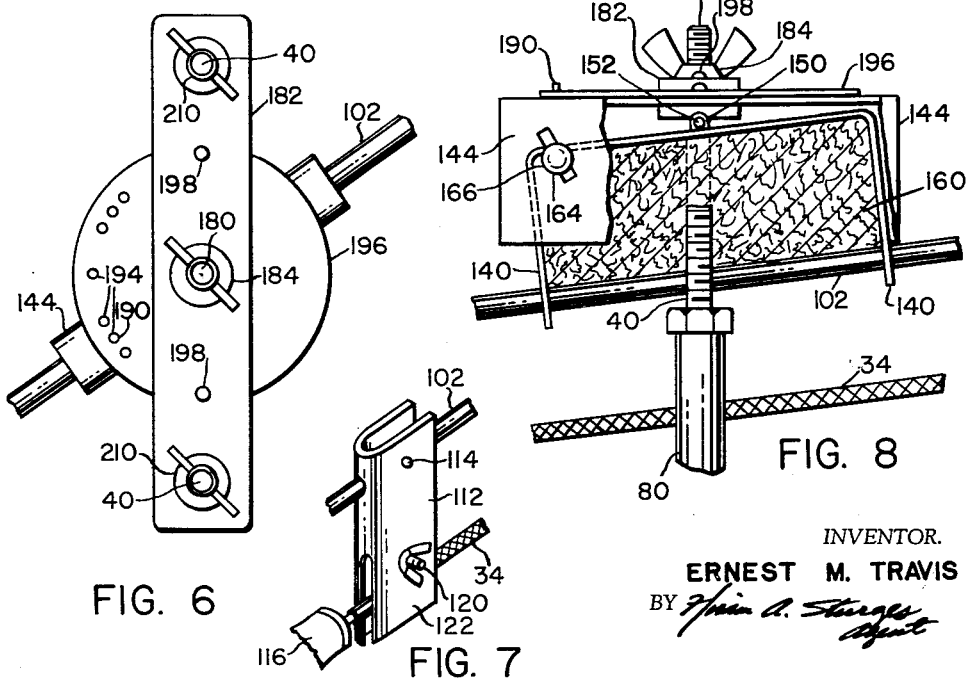
FIG. 6 is a top plan view of a central portion of the sharpener of FIG. 1 and is used with either the lower portion of FIG. 2 or FIG. 4.
FIG. 7 is a detail in perspective of the attachment of the file to the forward end of the carrier.
FIG. 8 is a side view of the upper portion of the sharpener of FIG. 4 which is identical to a side view of the sharpener of FIG. 1 except for the lower parts of certain frame posts shown in FIG. 8 which are in accord with FIG. 4 rather than FIG. 2.

The bolt 152 can also be a pin or rivet and extends through the side of the second or upper portion 144 of the carrier mounting whereby the lower mounting portion 140 is pivotally carried by the upper part 144 whereby the file carrier elongated portion 102 is free to assume various inclined positions with respect to the horizontal to permit the file 34 to be selectively inclined as best seen in FIG. 8.

The upper and lower parts of the mounting are both preferably of U-shape and are disposed opening downwardly and there is a hollow space thereby formed below the top of the first part 140 and above the file carrier elongated portion 102 in which absorbent packing 160 is received which can be soaked with oil to lubricate the file carrier in its sliding movements.

The sides of the upper part 144 of the mounting are slotted for receiving therethrough a bolt 164 with the wing nut 166 on its other end whereby when the nut is drawn up the sides of the upper part 144 press against and firmly hold the lower carrier part 140.

The upper carrier mounting part has a bolt 180 extending vertically therethrough which is also disposed through a horizontal bar 182 which forms a part of the frame and the wing nut 184 on the bolt 180 permits the releasable clamping of the upper carrier part 144 in any one of many positions of different rotated relation about the axis of the bolt 180.

The file carrier has a pin 190 extending vertically upwardly therefrom and which is adapted to be received in any one of a plurality of spaced apart vertical holes 194 in a plate 196 which is disposed above the file carrier mounting whereby different ones of the holes can be used at different times to selectively position the file carrier and file with respect to the frame. Pins 198 secure the plate 196 to the bar 182.

The bar 182 is suitably secured on the posts 40 above the file carrier mounting 142 by means of nuts 210 for the adjustable vertical positioning of the bar 182.

A modification of the lower or clamping portion of the invention is shown in FIG. 4 and is a substitute for the part shown in FIG. 2. Referring to FIGURES 4 and 5 we find two frame posts 40 similar to the frame posts 40 of the sharpener of FIGURES 1 and 2 but in FIGURE 4 the frame has a vertical lower portion 300 which is flat on its forward side and on its rearward side and is provided with a vertically elongated slot 302 therethrough. The vertical lower frame portion is secured to the bolts 40 by having its ends curled about the bolts 40 as best seen at 301. Suitable nuts 303 are disposed above and below the curled portions 301 and clamp thereagainst to firmly hold the latter in place on the bolts 40. The back portion of the clamping means of FIGURES 4 and 5 comprises a vertically disposed plate 306 slidably arranged against the forward side of the vertical lower frame portion 300. The forward portion of the clamping means is disposed forwardly of the rearward portion 306 and comprises a vertically disposed clamping member 308.

A vise-receivable bar 309, adapted to be gripped in the jaws 310 of a vise, has its forward sides disposed against the back side of said vertical lower frame portion and is slidable thereagainst, the bar 309 having an aperture therethrough disposed in alignment with the vertically elongated slot 302 in the vertical lower frame portion, a bolt 320 is disposed through the aperture in the bar 309 and through the forward and rearward clamping members 308 and 306 and the forward end of the bolt 320 receives a cam lever 322 attached thereto which latter is preferably of a U-shape having side 324 disposed one on each side of a head 326 of the bolt 320 at the forward side of the bolt 320, the sides 324 being secured to the bolt head 326 by a pin 328.

The forward or terminal ends of the sides 324 project forwardly of the bolt head and are adapted to press against the forward side of a series of spacing washers 334 which are disposed between the bolt head 326 and the forward clamping member 308 whereby when the cam lever 322 is placed in a horizontal outwardly extended position its inner ends swing from the position shown in FIG. 5 to a position pressing against the washers 334 for clamping the forward and rearward clamping members about the saw bar and for clamping the forward and rearward clamping members and the vise-receivable bar 309 in a fixed position with respect to the lower vertical frame portion 300.

Suitable means is provided for assuring that the bar 309 and the forward and rearward clamping members 308 and 306 are movable only in a vertical direction with respect to the lower frame portion 300 and such means preferably comprises the provision of a second slot 350 below the first slot 302, the second slot being also through the lower frame portion 300 and also being vertically elongated for the purpose of receiving a bolt 352 having a head adjacent the forward clamping member 308 and a nut 354 tightened against the rearward side of the vise receivable bar 309.

Two springs are attached to the lower edge of the vertical frame portion 300 by hooking them under outwardly and downwardly bent struck-out portions 370 of the portion 300. The springs 372 bend upwardly one on each side of the vise receivable bar 309 and extend upwardly and are attached by pegs 380 to the upper end of the bar 309 whereby these springs 372 by their tension tend to urge the lower vertical frame portion 300 and the file which is indirectly attached thereto upwardly whenever the cam lever 322 is released so as to hold the file clear of such chain during new positioning of the chain with respect to the file for the filing of a subsequent tooth of said saw chain.

From the foregoing description, it is thought to be obvious that a saw chain sharpener constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A chain saw sharpener for attachment to the vertical saw bar of a chain saw comprising a tooth top-engaging portion comprising two horizontally spaced apart sections each having an under surface disposed horizontally for engaging the upper sides of a plurality of teeth of a horizontally extending row of teeth of a chain carried by said saw bar for positioning the sharpener accurately, a frame mounted on and extending above and below said tooth top engaging portion, clamping means attached to the lower end of said frame and adapted to clamp against each side of said saw bar to secure the sharpener in place, a chain side engaging portion having a flat vertical forward surface for receiving the rearward side of said chain to absorb the force of filing and to steady the tooth being filed for more rapid and accurate filing with lesser vibration, said chain side engaging portion being disposed beneath said top engaging portions and forming a part of said frame and having a notch extending downwardly into it from its upper end between said top engaging portions, an elongated file generally horizontally disposed and extending through said notch, a file carrier having an upper elongated generally horizontal portion above said file, means attaching said file to said file carrier, a file carrier mounting slidably receiving said elongated portion of said file carrier, said file carrier mounting having an open space therein and said open space being positioned above the file carrier, absorbent material positioned in the open space of the file carrier mounting for retaining oil for lubricating the file carrier, and means adjustably attaching said file carrier on said frame for disposing said file at a plurality of angles with respect to said chain side engaging portion.

2. In a chain saw sharpener, the combination which comprises spaced lower L-shaped frames having horizontal sections thereof positioned to ride upon upper surfaces of saw teeth of a chain saw and vertically disposed legs positioned to bear against one of the sides of links of a chain of a chain saw bar, each of said spaced L-shaped frames having a vertically disposed opening therethrough, vertically positioned threaded posts extended through the openings of the horizontal sections of said L-shaped frame, clamping means including spaced upper L-shaped members having horizontal sections extended over said horizontal sections of the lower L-shaped frames and also having vertically disposed openings positioned to receive the threaded posts therein, nuts threaded on the posts for securing the L-shaped elements in adjusted positions, a longitudinally disposed bar adjustably mounted on upper ends of the posts, an inverted housing carried by said bar, and a file carrier pivotally mounted in the housing and arranged to position a file carried thereby transversely in an area between the L-shaped frames and members.

3. In a chain saw sharpener as described in claim 2, means for clamping the elements of the sharpener to the bar of a chain saw.

4. A chain saw sharpener as described in claim 2 wherein the file carrier includes a U-shaped member having depending ends, a horizontal rod extended through said ends and having a depending end section with a file retaining socket at the lower end at one end, and a support on the opposite end for holding the opposite end of the file.

5. In a chain saw sharpener, the combination which comprises spaced lower L-shaped frames having horizontal sections positioned to ride upon upper surfaces of saw teeth of a chain saw and vertically disposed legs positioned to bear against the side surfaces of one of the sides of a chain of a chain saw bar, each of said spaced L-shaped frames having a vertically disposed opening extended through the horizontal section thereof, threaded vertically positioned posts extended through the threaded openings of the horizontal sections of the lower L-shaped frames, spaced upper L-shaped members having horizontally disposed sections extended over the horizontal sections of the lower L-shaped frames, said horizontally disposed sections of the upper L-shaped members also having threaded openings therein and said threaded openings of the upper L-shaped members being in registering relation with the openings of the lower L-shaped frames, the threaded posts also extending through the openings of the horizontal sections of the upper L-shaped members, a clamp mounted on vertical portions of said upper L-shaped members for securing the elements on a chain bar, a horizontal bar positioned on upper ends of the posts, nuts threaded on the posts for retaining the horizontal bar and L-shaped members and frames in adjusted positions, an inverted housing carried by the horizontally disposed bar, a U-shaped file carrier pivotally mounted in said inverted housing, and means for removably mounting ends of a file in said file carrier whereby the file extends transversely through an area between the L-shaped elements.

References Cited in the file of this patent

UNITED STATES PATENTS

| | | |
|---|---|---|
| 2,736,216 | Paradis et al. | Feb. 28, 1956 |
| 2,762,241 | Nielson | Sept. 11, 1956 |
| 2,818,752 | Granberg | Jan. 7, 1958 |
| 2,859,642 | Travis | Nov. 11, 1958 |
| 2,900,850 | Travis | Aug. 25, 1959 |